United States Patent [19]

Lemper et al.

[11] 4,155,899
[45] May 22, 1979

[54] POST BULK POLYMERIZATION PROCESS FOR POLYVINYL HALIDE AND COMPOSITION THEREOF

[75] Inventors: Anthony L. Lemper, Tonawanda; Gilbert Witschard, Grand Island; Victor A. Pattison, Clarence Center, all of N.Y.

[73] Assignee: Hooker Chemicals & Plastics Corp., Niagara Falls, N.Y.

[21] Appl. No.: 711,672

[22] Filed: Aug. 4, 1976

Related U.S. Application Data

[63] Continuation-in-part of Ser. No. 465,008, Apr. 24, 1974, abandoned, which is a continuation-in-part of Ser. No. 251,097, May 8, 1972, abandoned.

[51] Int. Cl.$^2$ .................. C08F 255/00; C08F 2/02; C08F 14/00
[52] U.S. Cl. .................. 260/42.53; 260/878 R; 260/884; 526/65; 526/66; 526/73; 526/344; 526/345
[58] Field of Search .............. 260/878 R, 884, 42.53; 526/65, 66, 73, 344, 345

[56] References Cited

U.S. PATENT DOCUMENTS

| | | | |
|---|---|---|---|
| 3,687,919 | 8/1972 | Thomas | 526/66 |
| 3,725,367 | 4/1973 | Kemp | 260/884 |
| 3,759,885 | 9/1973 | Thomas et al. | 526/73 |
| 3,855,162 | 12/1974 | Durand et al. | 260/42.53 |
| 3,868,347 | 2/1975 | Sabel et al. | 260/42.53 |
| 3,875,130 | 4/1975 | Kemp | 260/884 |
| 3,933,771 | 1/1976 | Eastman et al. | 526/73 |
| 3,966,673 | 6/1976 | Frick et al. | 260/42.53 |
| 4,007,235 | 2/1977 | Walker | 260/878 R |
| 4,028,329 | 6/1977 | Kahn et al. | 260/884 |

OTHER PUBLICATIONS

Derwent Abstract of Netherlands 155,845, Central Patents Index–Classified Alerting Bulletin; Section A, Week A11, May 3, 1978, p. 14.

*Primary Examiner*—Alan Holler
*Attorney, Agent, or Firm*—Peter F. Casella; James F. Mudd; David A. Stein

[57] ABSTRACT

An improved polyvinyl halide or a polyvinyl halide copolymer containing up to 50 percent of a comonomer can be obtained by post polymerizing in a single stage or two-stage bulk process in contact with a base polymer, the same or different monomer as the monomer used to form the base polymer. Compositions produced by the process of the invention are useful in making films, coated fabrics and molded objects. The liquid phase post polymerization process of the invention is applicable to base polymers in powder form prepared by emulsion, suspension and bulk polymerization processes. The base polymer can be present in a polymerization mixture in which only a partial amount of monomer has been converted to base polymer such as in a two-stage polymerization process or the base polymer can be used in dry, solid form. Polymers of the invention have improved bulk density and reduced plasticizer uptake and can be used to prepare fabric coatings. Copolymers prepared by the novel post-polymerization process of the invention which show increased impact strength in addition to improved bulk density and reduced plasticizer uptake are useful in the preparation of molding compounds. In the bulk polymerization process of the invention, the addition of the same monomer or monomers or a different monomer or monomers subsequent to the partial conversion by a two-stage bulk process of polymerization of the vinyl halide monomer or monomers or vinyl halide monomer and comonomer, results in higher yield than can be obtained in the same reaction vessel as compred with a usual two-stage bulk polymerization process. In the two-stage bulk polymerization process of the invention, the use of small amounts of a hydrocarbon rubber dissolved or dispersed in the monomer effectively prevents reactor fouling during polymerization.

Where desired, a small particle size product can be obtained by incorporating in the first stage of a two-stage bulk polymerization process either an inert finely divided additive, a surfactant, a mixture thereof, or a polyolefin.

30 Claims, No Drawings

POST BULK POLYMERIZATION PROCESS FOR POLYVINYL HALIDE AND COMPOSITION THEREOF

CROSS REFERENCE TO RELATED APPLICATION

This is a continuation-in-part of copending application Ser. No. 465,008 filed Apr. 24, 1974, now abandoned, which is a continuation-in-part of application Ser. No. 251,097, filed May 8, 1972, now abandoned.

BACKGROUND OF THE INVENTION

1. Field of the Invention

This invention relates to the preparation of (1) homopolymers and copolymers of a vinyl halide such as vinyl chloride characterized by the properties of small particle size, higher bulk density, reduced plasticizer absorption and easy processability and (2) copolymers of a vinyl halide such as vinyl chloride having improved impact strength properties.

The viscosity of plastisols which utilize extender resins is affected not only by the plasticizer absorption characteristics of the polymers but also by the average particle size, the particle size distribution and the bulk density of the particles. Certain polymers of the invention are particularly useful as extender polymers for this application. These polymers are also useful for the manufacture of films and as coatings for fabrics. The high impact strength polymers of the invention are used in the preparation of moldings.

2. Description of the Prior Art

In an article entitled "Vapor Phase Polymerization of Vinyl Chloride" in the *Journal of Applied Polymer Science*, Vol. 15, Pages 445-451, 1971, by Kahle et al., a process is disclosed for the polymerization of vinyl chloride utilizing a liquid bulk polymerized polymer as a seed for a subsequent vapor phase polymerization process. The product is said to have reduced plasticizer absorption. In the process, general purpose grade polyvinyl chloride powder is ground to a suitable size to produce small particle size polymer product. Similar processes are disclosed in U.S. Pat. No. 3,595,840 and U.S. Pat. No. 3,622,553.

French Pat. No. 1,588,381 discloses the addition of fresh vinyl chloride and initiator to a vinyl chloride reaction mixture which has already been bulk polymerized to a substantial extent in a single stage reactor and the submission of this mixture to bulk polymerization in order to obtain polyvinyl chloride granules having excellent plasticizer absorption in the cold and in various according to the duration of their dwelling under polymerization conditions.

U.S. Pat. No. 3,583,956 relates to a process for producing vinyl chloride copolymers having a lower softening point than polyvinyl chloride comprising initially polymerizing vinyl chloride to at least 40% conversion, adding a different vinyl monomer in an amount less than remaining unreacted vinyl chloride and continuing the polymerization at a temperature at least 5° centigrade higher than the first polymerization temperature, preferably 10° to 35° centigrade. The specification discloses that the reaction can be carried out in bulk, solution, emulsion or suspension polymerization processes, but only suspension polymerization processes are described in the Examples.

U.S. Pat. No. 3,725,367 relates to the use of a vinyl chloride latex as a seed polymer in a bulk polymerization process to obtain small particle size vinyl chloride particles having a narrow granular size distribution within the range of 10-50 microns.

U.S. Pat. No. 3,687,923 relates to a process for the polymerization of vinyl chloride in bulk comprising polymerizing a portion of the monomer so as to form seeds, and subsequently adding a larger portion of liquid monomer and continuing the polymerization with mild agitation. The amount of monomer used in the first stage of the polymerization should be at least ⅛ by weight of the total quantity of monomer, which is to undergo reaction. An Example shows a product containing 73% particles between 100 and 200 microns in size.

U.S. Pat. No. 3,230,206 relates to a process for the suspension polymerization of copolymers having an heterogeneous structure, good flow properties, and low temperature impact strength by polymerizing acrylic acid esters and vinyl chloride. A portion of the vinyl chloride is added after 5-20 percent of the copolymer is formed.

U.S. Pat. No. 2,961,432 relates to a process for the bulk polymerization of homopolymers and copolymers whereby mixtures of liquid monomers and polymer powders are formed and polymerization carried out. The monomer used corresponds to the same monomer used to form the polymer powder.

SUMMARY OF THE INVENTION

This invention relates to a method of obtaining a high bulk density vinyl halide polymer having reduced plasticizer absorption when compounded as an extender resin in a polyvinyl halide plastisol and to a method of obtaining unusual polymers of vinyl halide by polymerization with other ethylenically unsaturated monomers to provide, in addition to properties such as low plasticizer absorption and higher bulk density, such polymer properties as reduced melt viscosity, lower glass transition temperature and greater impact strength. By the process of the invention, particles of a vinyl halide polymer or copolymer in powder form can be used as seed as produced from conventional emulsion, suspension, of bulk polymerization methods. Preferably, such seeds are utilized in a post polymerization in the liquid state under bulk polymerization conditions wherein further polymerization takes place within the particles rather than on the surface of the particles used as seed. The post polymerization process of the invention can be integrated with a two-stage liquid bulk polymerization process comprising high speed agitation during a first stage in which about 3 to about 20 percent, preferably 7 to about 12 percent by weight of the monomer or monomers are converted, followed by polymerization in a second stage with low speed agitation. By the two-stage polymerization process of the invention, additional monomer is incorporated into the product during the second stage reaction after partial conversion of monomer or monomers to polymer. Reactor productivity can be increased about 25 percent by the method of the invention. Usually, additional initiator is used, together with the additional monomer. Alternately, a higher temperature reactive additional initiator may be added at the beginning of said second stage reaction and the post polymerization conducted at a higher reaction temperature suitable to activate the additional initiator.

By the method of the invention wherein a polyvinyl halide polymer or copolymer is prepared in a two-stage liquid phase bulk process and the post polymerization is conducted during some portion of the second stage, high bulk density, low plasticizer absorption products can be obtained by the incorporation of additional amounts of the same vinyl halide monomer or comonomers. It is not necessary to isolate the resin produced prior to post polymerization but only to polymerize the vinyl halide monomer or comonomers to the powder form prior to the addition of the same monomer or a different monomer. Where the same process is used, but dissimilar monomers are used in the post polymerization step, besides reduced plasticizer absorption, reduced melt viscosity and increased impact strength can be obtained.

When it is desired to produce small particle size vinyl halide polymers by the bulk process of polymerization, seed particles can be utilized from emulsion polymerized or suspension polymerized vinyl halide polymers in the liquid phase post bulk polymerization process of the invention. Alternately, the liquid phase bulk polymerization process described in U.S. application Ser. No. 169,838, filed Aug. 6, 1971, now abandoned, and its continuation-in-part, copending U.S. application Ser. No. 597,617, filed July 21, 1975, can be utilized to produce a small particle size seed particle as a base for the post polymerization process of the invention. Still further, alternatively, the liquid phase bulk polymerization process of U.S. Pat. No. 3,933,771, and the abandoned antecedent application thereof, discussed below, or of copending U.S. application Ser. No. 674,202, filed Apr. 5, 1976, and the abandoned antecedent applications thereof, discussed below, can be used to produce said small particle size seed particle.

DESCRIPTION OF THE PREFERRED EMBODIMENTS

The preferred method of the invention contemplates the addition of at least one monomer to a base polymer or base copolymer, bulk polymerized in the liquid phase which functions as a seed particle, followed by post polymerization of said monomers so as to provide a polymer or copolymer having increased bulk density, reduced plasticizer absorption and, by appropriate selection of additional monomer or monomers added during the post polymerization reaction, increased impact strength, reduced melt viscosity and lower glass transition temperature. The additional monomer or monomers are added either all at once or continuously at a stage in the bulk process where conversion of the bulk polymerized base polymer or base compolymer to the powder form has been obtained. This is a conversion of about 30 to 95 percent, preferably about 30 to 80 percent. Where the additional monomer or monomers are added continuously, the rate of addition is adjusted so as to provide for completion of addition before the end of the polymerization cycle. The proportion of monomer or monomers added is generally from about 1 to about 200 percent by weight of the resultant converted polymer preferably from about 2 to about 150 percent by weight on the weight of the resultant converted polymer.

A less preferred method of the invention contemplates the addition of at least one monomer to a base polymer produced by a suspension or emulsion polymerization process. A polymer product is obtained having increased bulk density, lower glass transition temperature, reduced melt viscosity and improved impact strength. The polymers produced by the process of the invention can have bulk densities of about 0.3 grams per milliliter to about 0.9 grams per milliliter and impact strengths of about 2 to about 30 foot pounds per inch of notch.

In the method of the invention wherein seed particles of a vinyl halide polymer produced by emulsion, suspension or liquid phase bulk polymerization processes are used, the additional monomer is added to the seed particles in powder form and a liquid bulk polymerization process is initiated. In a preferred aspect of the process wherein an integrated bulk polymerization process is obtained, the vinyl halide monomer can be polymerized in either a single stage or a two-stage process of bulk polymerization until a monomer conversion of between about 30 percent to about 95 percent, preferably between about 30 percent to about 80 percent is achieved and subsequently the additional monomer which may be the same as the vinyl halide monomer used initially or alternately a different monomer may be added.

The preferred two-stage bulk polymerization process used in the invention is disclosed in British Pat. No. 1,047,489 and U.S. Pat. No. 3,522,227, both of which are incorporated herein by reference.

The vinyl halide monomers included within the scope of the invention include, e.g., vinyl fluoride, vinyl chloride, vinyl bromide, vinyl iodine, vinylidene fluoride, vinylidene chloride, vinylidene bromide, vinylidene iodide and the like, although vinyl chloride is preferred. It is intended to include within the scope of the invention all alpha-halo-substituted ethylenically unsaturated compounds which are capable of entering into an addition polymerization reaction. The polymers of the present invention can be formed of the same of different alpha-halo-substituted ethylenically unsaturated materials and, thus, the invention is intended to cover homopolymers, copolymers, terpolymers and tetrapolymers formed by addition polymerization. Illustrative of these copolymers is a copolymer of vinyl chloride and vinylidene chloride. The term "vinyl halide polymer" as used in this specification and claims is intended to include both of vinyl halide homopolymers and copolymers prepared using a vinyl halide and ethylenically unsaturated monomers copolymerizable therewith.

While the monomer compositions can be comprised totally of vinyl halide monomer, the present invention is also intended to include copolymers formed by the free-radical addition polymerization of a monomer composition containing a predominant amount, e.g., at least 50% of vinyl halide, preferably 80% of a vinyl halide and a minor amount, e.g. up to 50% by weight of another ethylenically unsaturated monomer material copolymerizable therewith. Preferably, the other ethylenically unsaturated monomer material is used in amounts of less than 20% by weight and more preferably in amounts less than 10% by weight of the total monomer compounds used in preparing the polymer. Suitable ethylenically unsaturated monomer materials which can be used to form base copolymers, terpolymers, interpolymers and the like, are illustrated by the following monoolefinic hydrocarbons, i.e., monomers containing only carbon and hydrogen, including such materials as ethylene, propylene, butene-1, 3-methylbutene-1, 4-methylpentene-1, pentene-1, 3,3-dimethylbutene1, 4,4-dimethylbutene-1, octene-1, decene-1, styrene and its nuclear alpha-alkyl or aryl substituted derivatives, e.g., o-, m- or p-methyl, ethyl, propyl or butyl styrene; alpha-methyl, ethyl, propyl or butyl styrene; phenyl styrene, and halogenated styrenes such as alpha-chlorostyrene; monoolefinically unsaturated esters including vinyl esters, e.g., vinyl acetate, vinyl propionate, vinyl butyrate, vinyl stearate, vinyl laurate, vinyl benzoate, vinyl caprate, vinyl hexanoate, vinyl-p-chlorobenzoates, alkyl methacrylates, e.g., methyl, ethyl, propyl and butyl methacrylate; octyl methacrylate, lauryl methacrylate, stearyl methacrylate, alkyl crotonates, e.g., octyl; alkyl acrylates, e.g., methyl, ethyl, propyl, butyl, 2-ethyl hexyl, stearyl, n-hexyl, n-octyl, hydroxyether and tertiary butylamino acrylates, 2-ethoxy ethyl acrylate, 2-methoxy ethyl acrylate, isopropenyl esters, e.g., isopropenyl acetate, isopropenyl propionate, isopropenyl butyrate and isopropenyl isobutyrate; isopropenyl halides, e.g., isopropenyl chloride; vinyl esters of halogenated acids, e.g., vinyl alpha-chloroacetate, vinyl alpha-chloropropionate and vinyl alpha-bromopropionate; allyl and methallyl esters, e.g., allyl chloride, allyl cyanide; allyl chlorocarbonate, allyl nitrate, allyl formate and allyl acetate and the corresponding methallyl compounds; esters of alkenyl alcohols, e.g., beta-ethyl allyl alcohol and beta-propyl allyl alcohol; halo-alkyl acrylates, e.g., methyl alpha-chloroacrylate, and ethyl alpha-chloroacrylate, methyl alpha-chloroacrylate, and ethyl alpha-chloroacrylate, methyl alpha-bromoacrylate, ethyl alpha-bromoacrylate, methyl alpha-fluoroacrylate, ethyl alpha-fluoroacrylate, methyl alpha-iodoacrylate and ethyl alpha-iodoacrylate; and alkyl alpha-cyanoacrylates, e.g., methyl alpha-cyanoacrylate and ethyl alpha-cyanoacrylate; itaconates, e.g., monomethyl itaconate, monoethyl itaconate, diethyl itaconate, the mono- and di-esters of itaconic acid with C-3 to C-8 alcohols; maleates, e.g., monomethyl maleate, monoethyl maleate, dimethyl maleate, diethyl maleate; the mono- and di-esters of maleic acid with C-3 to C-8 alcohols; and fumarates, e.g., monomethyl fumarate, mono-ethyl fumarate, dimethyl fumarate, diethyl fumarate, the mono- and di-esters of fumaric acid with C-3 to C-8 alcohols and diethyl glutaconate; monoolefinically unsaturated organic nitriles including, for example, fumaronitrile, acrylonitrile, methacrylonitrile, ethacrylonitrile, 1,1-dicyanopropene-1, 3-octenenitrile, crotonitrile and oleonitrile; monoolefinically unsaturated carboxylic acids including, for example, acrylic acid, methacrylic acid, crotonic acid, 3-butenoic acid, cinnamic acid, maleic, fumaric and itaconic acids, maleic anhydride and the like. Amides of these acids, such as acrylamide, are also useful. Vinyl alkyl ethers and vinyl ethers, e.g., vinyl methyl ether, vinyl ethyl ether, vinyl propyl ether, vinyl n-butyl ether, vinyl isobutyl ether, vinyl 2-ethylhexyl ether, vinyl 2-chloroethyl ether, vinyl cetyl ether, and the like; and vinyl sulfides, e.g., vinyl beta-chloroethyl sulfide, vinyl beta-ethoxyethyl sulfide and the like can also be included as can diolefinically unsaturated hydrocarbons containing two olefinic groups in conjugated relation and the halogen derivatives thereof, e.g. butadiene-1,3; 2,3-dimethylbutadiene-1,3; 2-chlorobutadiene-1,3; 2,3-dichlorobutadiene-1,3; and 2-bromobutadiene-1,3 and the like.

Specific monomer compositions for forming the base copolymers can be illustrated by vinyl chloride and/or vinylidene chloride and vinyl acetate, vinyl chloride and/or vinylidene chloride and maleic or fumaric acid esters, vinyl chloride and/or vinylidene chloride and acrylate or methacrylate ester, vinyl chloride and/or vinylidene chloride and vinyl alkyl ether. These are given as illustrative of the numerous combinations of monomers possible for the formation of copolymers. The present invention is intended to cover all such combinations which fall within the scope of the present invention. While such combinations are intended to be included within the scope of the present invention, it is preferred that the base polymer be formed from vinyl halide monomer alone and most preferably vinyl chloride.

The monomer or monomers added subsequent to the partial conversion of monomer or monomers can be the same or different than the monomer or monomers used to form the base polymer and where different the monomer or monomers are preferably selected from those classes of monomers which polymerize at the same or a faster rate as compared to vinyl chloride. Examples of monomers useful in the post polymerization process of the invention are those listed above. Where impact strength is desired in the product of the process, monomers are used such as 1-olefins of 2 to 10 carbon atoms, e.g., ethylene, propylene, pentene-1, butene-1, octene-1, decene-1; vinyl esters such as vinyl butyrate, vinyl stearate, vinyl laurate, vinyl caprate, vinyl hexanoate; alkyl methacrylates such as octyl methacrylate; alkyl acrylates such as ethyl acrylate, propyl acrylate, butyl acrylate, 2-ethyl hexyl acrylate, stearyl acrylate, n-hexyl acrylate, n-octyl acrylate; hydroxyether acrylates such as 2-methoxy ethyl acrylate, 2-ethoxy ethyl acrylate; maleates, fumarates and itaconates such as monomethyl maleate, monoethyl maleate, dimethyl maleate, diethyl maleate, monomethyl itaconate, monoethyl itaconate, dimethyl itaconate, diethyl itaconate, monomethyl fumarates, monoethyl fumarate, dimethyl fumarate, diethyl fumarate, alcohol maleates, fumarates and itaconates having an alcohol chain length of C-3 to C-8; vinyl alkyl ethers and vinyl ethers, such as vinyl methyl ether, vinyl ethyl ether, vinyl propyl ether, vinyl n-butyl ether, vinyl isobutyl ether, vinyl 2-ethylhexyl ether, vinyl cetyl ether; diolefinically unsaturated hydrocarbons containing two olefinic groups in conjugated relation, such as butadiene-1,3; 2-methylbutadiene-1,3; 2,3-dimethylbutadiene-1,3; 2-chlorobutadiene-1,3. Impact strength values for the polymers of the invention are about 2 to about 30 foot pounds per inch at ambient temperature.

Where copolymers having good impact strength at temperatures below ambient temperature as well as impact strength at room temperature are desired to be produced by the process of the invention, a vinyl halide monomer alone or in admixture with other monomers are used to form the base polymer, and the post polymerization process step utilizes a monomer or monomers such as the acrylates which can be polymerized alone to form rubbery homopolymers having glass transition temperatures of 10° C. or below. Acrylic acid esters are particularly desirable as monomers for use in providing vinyl halide copolymers having good impact strength. The acrylic acid esters found useful are those which contain about 2 to about 15 carbon atoms in the alkyl group preferably about 2 to about 11 carbon atoms and most preferably about 4 to about 8 carbon atoms. Such monomers are added either all at once or continuously to the bulk polymerization process of the invention when conversion of the base vinyl halide polymer has been obtained of between about 30 to about 95 percent, preferably about 50 to about 95 percent conversion at a time when the base polymer is in the powder form. Preferred acrylic acid ester comonomers for producing polymers having low temperature impact strength are 2-ethyl hexyl acrylate, n-hexyl acrylate, and n-octyl acrylate.

The free radical bulk polymerization can take place in accordance with the process of the invention at temperatures between 0 and 90 degrees centigrade. The polymerization reaction is conducted in the presence of a free radical initiator. Useful free-radical initiators are organic or inorganic peroxides, persulfates, ozonides, hydroperoxides, peracids and percarbonates, azo compounds, diazonium salts, diazotates, peroxy sulfonates, trialkyl borane-oxygen systems, and amine oxides. Azobisisobutyronitrile is particularly useful in the present invention. The catalyst is used in concentrations ranging from about 0.01 to about 1.0% by weight based on the total weight of the monomers. For use in mass, suspension, and solution polymerization, the catalysts which are soluble in the organic phase, such as benzoyl peroxide, diacetyl peroxide, azobisisobutyronitrile, diisopropyl peroxydicarbonate, azobis (alpha-methyl-gamma-carboxylbutyronitrile), caprylyl peroxide, lauroyl peroxide, azobisisobutyramidine hydrochloride, t-butyl peroxypivalate, 2,4-dichlorobenzoyl peroxide, azobis (alpha, gamma-dimethylvaleronitrile), and 2,2'-azobis(2,4-dimethyl valeronitrile) are generally used. Preferably, the initiator which is used is chosen from a group of initiators known in the prior art as the "hot catalysts" or those which have a high degree of free-radical initiating activity. Initiators with a lower degree of activity are less desirable in that they require longer polymerization times. Also, long polymerization times may cause preliminary product degradation evidenced by color problems, e.g., pinking.

The polymerization products of the present invention can be admixed with various conventional inert additives, such as fillers, dyes, and pigments. In addition, the polymerization products can be admixed with plasticizers, lubricants, thermostabilizers and ultraviolet light stabilizers as desired.

In the post liquid phase bulk polymerization method of the invention, all other conditions and measures are those conventionally employed in the previously known processes for bulk polymerization of vinyl chloride comprising a two-stage polymerization as disclosed in British Pat. No. 1,047,489 and U.S. Pat. No. 3,522,227, the disclosure of which is incorporated herein by reference. In an integrated post polymerization process of the invention with a two-stage bulk polymerization process for vinyl halide, the reaction is conducted in a first stage reactor with means chosen to agitate the monomer or monomers of a type capable of providing high shear and commonly referred to as a "radial turbine type" agitator. At the start of the first stage reaction, the vessel is charged with a monomer composition to which a catalyst has been added. Any polymerization catalyst generally used in bulk polymerization methods, that is those hereinabove described can be used to an extent which is usual for bulk polymerization processes. After addition of the vinyl chloride monomer to the first stage reactor, a small amount of monomer is vented in the process of removing the air from the first stage reactor vessel. The speed of the turbine type agitator generally lies between 500 and 2,000 revolutions per minute or a tip speed of about 2 to 7 meters per second in the first stage reactor. A tip speed of about 0.5 to about 2 meters per second is used in the second stage reactor. These figures should not be regarded as limiting values. As soon as a conversion of at least about 3 to about 20 percent of the monomer composition has been obtained in the first stage reactor, the contents of the vessel are transferred to a seond stage polymerization vessel equipped to provide slow speed, low shear agitation so as to insure proper temperature control of the reaction medium.

By the method of the invention, a small particle size polymer can be obtained. The size of the polymer particles is reduced over methods of the prior art by the incorporation of an additive or a surfactant or mixture thereof to the first stage of the bulk polymerization process. Thus, there is incorporated with the monomer or monomers in a first stage polymerization reactor 0.001 percent to 5 percent by weight, based on the monomer or monomers present in the first stage of the vinyl chloride polymerization of an additive to control polymer particle size, said additive having an average particle size in the range of about 0.001 to about 50 microns. A suitable additive is fumed silica sold by Degussa under the tradename "Aerosil". The silica can be treated with an agent to render it hydrophobic. Such a treating agent is dichlorodimethylsilane which is used to produce a fumed silica sold under the tradename "Aerosil R-972" by Degussa. The silica used preferably is a fumed silica having an average particle size below $10^{-1}$ microns.

It is contemplated that both organic and inorganic solid particulate matter which is both insoluble in vinyl chloride monomer and solid at temperatures at least up to reaction temperatures can be used in conjunction with monomers disclosed in the invention in a bulk polymerization process to provide a reduction in particle size of the polymers produced. The average particle size of the solid, inert, particulate matter can be in the range of 0.001 micron to about 50 microns preferred. An example of an organic solid particulate material useful in the process of the invention is emulsion polymerized vinyl chloride having an average particle size of two microns. Examples of inorganic solid particulate materials other than fumed silica useful in the process of the invention are carbonates such as calcium, magnesium, zinc, cadmium, and barium carbonates, aluminum silicates, and talc. When large quantities of solid inert matter can be added to the monomer without adding excessively to the cost or detracting from the physical properties of the polymers obtained, it is possible to use organic or inorganic solid inert particulate matter having an average particle size range up to 50 microns. An operable amount of useful solid inert particulate matter may thus be obtained from materials having greater than the above preferred average particle size.

The surfactants, or surface active agents, used in combination with vinyl chloride monomer or monomers can be of the nonionic, cationic, or anionic type and are present in the first reaction stage in the range of 0.01 percent to 5 percent by weight based upon the monomer or monomers present in the first stage polymerization. Advantageously when a polyolefin is employed in the second stage of the polymerization according to a preferred mode of the invention described below a surfactant may be added with said second stage polyolefin, the amount of surfactant being about 0.01 to about 0.2 percent based on the weight of vinyl halide monomer added up to that point.

The surface active agents are organic agents having structurally unsymmetrical molecules containing both hydrophilic and hydrophobic moieties. The non-ionics do not ionize but may acquire hydrophilic character from an oxygenated side chain, usually polyoxyethylene. The oil-soluble part of the molecule can be aliphatic or aromatic in nature. The cationics ionize so that the oil-soluble portion is positively charged. Principal examples are quaternary ammonium halides such as benzethonium chloride and cetalkonium chloride. The anionics form negatively charged ions contained in the oil-soluble portion of the molecule. The ionizable group is the hydrophilic portion. Examples are sodium salts of organic acids, such as stearic acid and sulfonates or sulfates such as alkylaryl sulfonates, i.e., sulfonates of dodecylbenzene and sulfates of straight chain primary alcohols either fatty alcohols or products of the Oxo process, i.e., sodium lauryl sulfate. Examples of non-ionic surfactants that have proven effective are octylphenoxy polyethoxyethanols sold under the trade-name "Triton X-100" and "Triton X-35" by the Rohm & Haas Company, Philadelphia, Pa. Examples of anionic surfactants are as follows: calcium, zinc, magnesium, and nickel stearates. An example of an effective cationic surfactant is a quaternized amine sold under the trade-name "Quaternary O" by the Ciba-Geigy Corporation.

Additional examples of suitable surfactants and more detailed descriptions of their composition are presented in *McCutcheon's Detergents and Emulsifiers*, N. American Ed., 1975 Annual p. 35–265 the pertinent subject matter of which is incorporated herein by reference.

Further details of the use of the above-described particle size control additives and surfactants can be obtained from aforementioned copending application Ser. No. 597,617 filed July 21, 1975, which is incorporated herein by reference.

The use of a polyolefin additive in the first stage of a two stage vinyl halide polymerization according to the invention provides especially good control of product particle size and also inhibits formation of reactor scale. When any of the particle size control agents of the invention are employed, it is advantageous to add to the reaction additional polyolefin, preferably at the beginning of the second reaction stage, to inhibit scale formation.

The polyolefin additives of the invention are homopolymers, copolymers or terpolymers or aliphatic hydrocarbon olefins of 2 to 8 carbon atoms. Polymers of the aforementioned olefins which also contain monomer residues of aliphatic hydrocarbon polyenes e.g. dienes or trienes, of 4 to 18 carbon atoms can also be used. While advantageously the olefin polymers used in the invention contain only hydrogen as substituents, halogenated olefin polymers such as chlorinated, brominated and fluorinated polyolefins can also be employed. The weight average molecular weight of the olefin polymers, copolymers, and terpolymers employed as additives can vary from about 50,000 to about 300,000 and higher, up to 1,000,000 and higher. Preferably the polyolefin additive employed in the first stage of the present process has a weight average molecular weight of about 50,000 to about 1,000,000 while preferably the polyolefin additive added in the second stage has a weight average molecular weight of about 50,000 to about 300,000. Preferably also, the first stage polyolefin additive is a polyene-modified olefin of the type described above whereas the second stage polyolefin additive is advantageously free of polyene monomer residues.

In general the amount of polyolefin added in the first stage of polymerization according to the invention is about 0.05 to about 4 weight percent, preferably about 0.1 to about 2 weight percent based on the weight of monomer or monomers employed in the first reaction stage. The amount of polyolefin charged to the reaction at the beginning of the second stage can be as low as about 0.05 to about 0.5 percent by weight based upon vinyl halide monomer, but more usually is about 0.05 to about 3 weight percent, preferably about 0.1 to about 2 weight percent, based on the weight monomer charged up to one point of the addition of the polyolefin at the beginning of the second reaction stage of the polymerization.

The use of olefin polymers in bulk vinyl halide polymerization processes is described more particularly in copending application Ser. No. 674,202 filed Apr. 5, 1976, which is a continuation-in-part of Ser. No. 427,895, filed Dec. 26, 1973, now abandoned which, in turn, is a continuation-in-part of Ser. No. 251,099, filed May 8, 1972, now abandoned. These applications are incorporated herein by reference.

It is thus an object of the present invention to provide a bulk polymerization process for the production of high molecular weight vinyl chloride polymers or copolymers having small particle size and the individual particle or agglomerate characterized as being non-porous. The porous particles are believed to be filled in with a low molecular weight polyvinyl chloride which renders such particles of polyvinyl chloride polymer or copolymer more resistant to solvation at ambient temperature as compared to polymers and copolymers of the prior art.

The reaction temperature in both first and second stage reactors is generally in the range from about 25° centigrade to about 80° centigrade, preferably about 30° to about 70° centigrade. The reaction pressure in the first stage reactor is generally in the range from about 130 pounds per square inch to about 210 pounds per square inch, preferably about 150 to about 190 pounds per square inch and corresponds to and results from the temperature used in the process. The reaction pressure in the second stage reactor is generally from about 80 to about 180 pounds per square inch, preferably from about 90 to about 105 pounds per square inch, and also corresponds to and results from temperature used in the process.

During the post polymerization, the temperature of the reactor contents can be raised from about 30° to about 70° centigrade to about 60° to about 80° centigrade, said increase in polymerization temperature being about 10° to about 50° centigrade, and the pressure raised from about 115 to about 215 pounds per square inch to about 160 to about 265 pounds per square inch in order to initiate the reaction where a higher temperature initiator is added at the beginning of the second stage of a two-stage bulk polymerization reaction process. Further details can be obtained of a process of bulk polymerization in two stages in which the temperature of the reactor contents is raised during the second stage of the process by reference to an earlier filed, commonly owned U.S. application, Ser. No. 379,886, filed July 16, 1973, now abandoned, and its continuation-in-part application Ser. No. 482,111, filed June 24, 1974, now issued as U.S. Pat. No. 3,933,771 which are hereby incorporated by reference.

When the post-polymerization is conducted at a higher reaction temperature than is used initially in the second stage of the polymerization process, said post-polymerization results in the particles produced being nonporous, being less susceptible to solvation when in contact at room temperature with a primary plasticizer for polyvinyl chloride or polyvinyl chloride copolymers. The polymers also fuse at a lower temperature.

In the process of the invention, additional monomer is added during the second stage part of the bulk polymerization process. In addition to the aforesaid advantages of the post polymerization the addition of monomer during the second stage has the advantage of increasing the yield of polymer since by the addition of monomer during the second stage, a greater yield is obtained of product from the reaction vessel used. Reactor productivity can thus be increased by about 25 percent.

In order to further illustrate this invention but without being limited thereto, the following examples are given. In this specification and claims, all parts and percentages are by weight, all pressures are gauge pressures, and all temperatures are in degrees centigrade unless otherwise specified.

EXAMPLE 1 - Control

In a vertical type first stage reactor of 2½ gallon capacity and stainless steel construction, equipped with a radial turbine type agitator were added 5.2 grams of fumed silica treated with dichlorodimethyl silane, 5.0 g. Triton X-100, 2.0 g. of a 29 percent solution of acetyl cyclohexane sulfonyl peroxide in dimethyl phthalate sold under the trademark "Lupersol 228P" by the Lucidol Division of the Pennwalt Company and 1.0 g. of a 40 percent solution of di-2, ethyl-hexyl peroxy dicarbonate in mineral spirits sold under the trademark "Lupersol 223M" by the Lucidol Division of the Pennwalt Company. 11.0 pounds of vinyl chloride were added to the reactor at a temperature of 20° centigrade and 1.0 pounds of the vinyl chloride monomer were vented to the atmosphere to remove air from the reactor. The mixture in the reactor was slowly raised in temperature while agitating using the radial turbine type agitator at a high agitation speed of 2,000 revolutions per minute to a temperature of 67° centigrade over a period of 1 hour and maintained at this temperature for a period of 15 minutes at a reaction pressure of 167 pounds per square inch.

The mixture was then transferred to a 5-gallon stainless steel reaction vessel containing 2.2 g. of "Lupersol 223M" and 3.0 g. lauroyl peroxide and 7 pounds of vinyl chloride agitated at a low agitation speed. 1.5 pounds of vinyl chloride were vented in order to clear the air from the reactor. The mixture was heated at 50° centigrade and the pressure raised to 105 pounds per square inch. These conditions were maintained over a period of 4.5 hours. Then, the mixture was heated and a pressure of 170 psi was maintained for 2.0 hours. The monomer that has not reacted is blown off and collected in a condensing circuit incorporating a filter so as to separate any particles of polymer carried over. The final traces of residual monomer absorbed by the particles of polymer are eliminated by placing the polymerizer under vacuum twice in succession and changing over to a nitrogen atmosphere in between. All the polymer composition is then passed through screening equipment. In this way, a powdery polymer is obtained in a yield of 13 pounds of polymer. The polymer has an average particle size of 48 microns as indicated by Coulter Counter measurements.

EXAMPLE 2

A bulk polymerized polyvinyl chloride homopolymer was made by the process of this invention using the same proportions of ingredients as in Example 1, but 10.0 pounds of degassed monomer was added after 4.5 hours polymerization time in the second stage and polymerization carried on for an additional 4 hours. In this way, a powdery polymer is obtained in a yield of 20 pounds. The polymer has an average particle size of 51 microns as indicated by Coulter Counter measurements.

Using the resins prepared in Examples 1 and 2 above, plastisols were made up using the following formulation. Seventy parts of an emulsion polymerized polyvinyl chloride homopolymer sold under the trademark "Geon 121" by B. F. Goodrich Chemical Company, 30 parts of the bulk polymerized polyvinyl chloride resin produced in the Examples above, and 60 parts of dioctylphthalate. The plastisols were prepared in the usual manner by combining the ingredients, blending until uniform using high speed agitation and deaerating to removed entrapped air. Viscosity was evaluated using a Brookfield Viscometer Model LVT with the plastisol being maintained at a temperature of 25° centigrade ±0.3° centigrade. A No. 3 spindle was used and viscosity was determined as follows after aging the plastisol two hours:

| Plastisol Made Using the Resin of | Brookfield Viscosity (Centipoises) |
| --- | --- |
| Example 1 | 5350 |
| Example 2 | 3700 |

EXAMPLE 3

To a one-liter glass autoclave equipped with a spiral stirring blade was added 180 grams of a polyvinyl chloride bulk polymerized polymer. The reactor was evacuated to 0.05 millimeters mercury pressure and then pressurized to 100 pounds per square inch gauge with nitrogen. This procedure was repeated and then 0.5 milliliters of a 21 percent solution of acetyl cyclohexane sulfonyl peroxide in mineral spirits. The reactor was evacuated and cooled to 5 to 10° centigrade and 345 grams of vinyl chloride were added and 30 grams vented off. The reactor jacket was heated with 80° water and the slurry was heated to a temperature of 72° centigrade within the reactor. After a period of two hours at this temperature, the reactor was cooled to 30° centigrade and the vinyl chloride was distilled from the reactor over a two hour period. A 310 gram yield of polymer was obtained after drying at 50° centigrade for 16 hours.

Examination of the vinyl chloride by optical microscope showed an average particle size of about 56 microns. The bulk polymerized starting polymer had an average particle size of 49 microns. In order to evaluate plasticizer absorption properties, a standard plastisol was made up of 70 parts of emulsion polymerized polyvinyl chloride sold under the trademark "Geon 121" by the B. F. Goodrich Chemical Company, 30 parts of the post polymerized polymer to be evaluated and 60 parts of diisooctyl phthalate. A plastisol made up using the polyvinyl chloride bulk polymerized starting polymer showed a viscosity of 4350 centipoises as measured by a LVT Brookfield Viscometer, spindle Number 3, speed 12 rpm at 25° centigrade and 2 hours aging time. A similar plastisol prepared using the product of the post polymerized process of the invention showed a viscosity of 2805 centipoises.

In a similar manner, polyvinyl chloride powders prepared by suspension polymerization and alternately emulsion polymerization were substituted for the bulk polymerized polymer used above to produce extender resins useful in the preparation of plastisols.

EXAMPLE 4 - CONTROL

A two stage bulk polymerized vinyl chloride was made using a one liter stainless steel reactor by adding a mixture of 0.10 milliliters of acetyl cyclohexane sulfonyl peroxide as a 29 percent solution in dimethyl phthalate and 0.25 milliliters of di(2-ethyl hexyl) peroxy dicarbonate as a 40 percent solution in mineral spirits. The reactor was alternately evacuated and pressurized with nitrogen to a pressure of 150 psig. The reactor was charged with 500 grams of vinyl chloride monomer and the polymerization was run for 20 minutes at 70° centigrade. The contents of the reactor were then transferred to a tubular reactor containing 250 grams of vinyl chloride, 0.20 milliliters of acetyl cyclohexane sulfonyl peroxide as a 29 percent solution in dimethyl phthalate and 0.5 milliliters di(2-ethyl hexyl) peroxy dicarbonate as a 40 percent solution in mineral spirits. The polymerization in this second stage reactor was run for 5 hours at 65° centigrade. The polymer was then isolated by venting off excess vinyl chloride and the polymer obtained as a dry polymer.

EXAMPLES 5 and 6

In the following Table, methyl acrylate was added during a second stage vinyl chloride bulk polymerization reaction having the same ingredients, proportions of ingredients and reaction conditions as in Example 4, except that 2 hours after the start of the second stage polymerization, a monomer was added to the polymerization mixture by placing the monomer in a steel bomb pressurized to 200 pounds per square inch gauge of nitrogen. At the moment of addition, two valves were opened, connecting the pressurized bomb and reactor to complete the addition.

repeated and then 0.5 milliliters was added of a 21 percent solution of acetyl cyclohexane sulfonyl peroxide in mineral spirits. The reactor was evacuated and cooled to 5° to 10° centigrade and 345 grams of vinyl chloride were added and 30 grams vented off. The reactor jacket was heated with 80° centigrade water and the slurry was heated to a temperature of 72° centigrade within the reactor. After a period of two hours at this temperature, the reactor was cooled to 30° centigrade and the unreacted vinyl chloride was distilled from the reactor over a two-hour period. This procedure was repeated to produce a second batch of polymer. The extent of post-polymerization as indicated by the effect on loose bulk density and flow times is shown in the following Table:

TABLE II

Effect on Post-Polymerization on Loose Bulk Density and Flow Time

| Resin | % Post Polymerization | Particle Size | Loose Bulk Density (g/cc) | Flow Time (sec.) |
|---|---|---|---|---|
| Example 4 | 0 | 115 μ | 0.52 | 7.2 |
| Example 7 | 54 | 133 μ | 0.58 | 5.6 |
| Example 8 | 55 | 129 μ | 0.59 | 4.2 |

EXAMPLES 9-10

In the following examples, bulk polymerizations were conducted using the same proportions and ingredients and process conditions as in Example 4, except that during the first stage reaction, the reactor is loaded with 450 grams of vinyl chloride monomer and the contents of the first stage reactor are transferred under pressure to a two-liter glass reactor constituting the second stage reactor and the procedure modified as indicated below so that an acrylate moomer is added during the second stage of the process at various specified times as indicated below. In Examples 9-19, the amount of vinyl chloride in the second stage reactor was less than shown in Example 4, the control, and corresponds to a total amount of 650 grams of vinyl chloride monomer, including polymer in the second stage reactor made up of 450 grams of vinyl chloride added in the first stage

TABLE I

| Example No. | Percent Monomer (Based on Vinyl Chloride Charged) | Additional Monomer | Yield (Percent) | Molecular Weight (Weight Average) | Bulk Density (Grams/Ml.) | Glass Transition Temperature °C. | Melt Viscosity[1] (0.2 and 2.0 inches/Min.) | Plastisol Viscosity[2] (Brookfield Viscometer LVT Spindle #3, 12 rpm, 25° C.) | |
|---|---|---|---|---|---|---|---|---|---|
| | | | | | | | | After 2 Hrs. | After 24 Hrs. |
| 4 | None | None | 70 | 83,200 | 0.46 | 73 | 8.65 × 10⁻⁴ 1.9 × 10⁻⁴ | 6,500 | 7,700 |
| 5 | 2 | Methyl Acrylate | 70.2 | 84,800 | 0.53 | 65 | 8.04 × 10⁻⁴ 1.89 × 10⁻⁴ | 5,200 | 6,200 |
| 6 | 3.6 | Methyl Acrylate | 71.4 | 95,600 | 0.66 | — | 7.45 × 10⁻⁴ 1.68 × 10⁻⁴ | 3,300 | 3,800 |

[1]Melt viscosity evaluated on polymer containing 2% dibutyltin-S,S'-bisisooctylmercapto acetate sold under the trademark "M & T-31" by the M & T Chemicals, Inc., Co. using an Instron Rheometer set at 200° C.
[2]Plastisol viscosity based upon a standard plastisol containing 70 parts emulsion polymerized polyvinyl chloride, 60 parts diisooctyl phthalate, and 30 parts of the polymer to be evaluated.

EXAMPLES 7 and 8

To a one-liter glass autoclave equipped with a spiral stirring blade were added 180 grams of a polyvinyl chloride bulk polymerized polymer made as in Example 4. The reactor was evacuated to 0.05 millimeters mercury pressure and then pressurized to 100 pounds per square inch gauge with nitrogen. This procedure was reactor and 200 grams of vinyl chloride added in the second stage reactor. In Table III below, there is set out the results of polymerization in which an acrylate monomer is added during a portion of the second stage polymerization. The monomer is added all at once in these examples at the specified time subsequent to the start of the second stage polymerization reaction.

Samples of the polymer obtained in Examples 9–19 were compression molded and tested for fusion time, as indicated by subsequent reduction in torque. Test results are shown in Table IV below.

TABLE III

| Example No. | Acrylate Monomer | Amount (g) | Time (Hours) Added After Start of 2nd Stage | Yield (%) Powder | Total |
|---|---|---|---|---|---|
| 9 | n-butyl acrylate | 50 | 2 | 55.2 | 79.4 |
| 10 | n-butyl acrylate | 60 | 2 | 53.9 | 74.9 |
| 11 | n-butyl acrylate | 70 | 0 | — | 75.9 |
| 12 | n-butyl acrylate | 70 | 1 | — | 76.0 |
| 13 | n-butyl acrylate | 70 | 2 | 56.5 | 77.0 |
| 14 | n-butyl acrylate | 70 | 3 | 65.5 | 80.1 |
| 15 | n-butyl acrylate | 90 | 2 | 38.7 | 75.7 |
| 16 | n-hexylacrylate | 70 | 2 | 43.5 | 59.9 |
| 17 | n-octylacrylate | 70 | 2 | 52.5 | 75.0 |
| 18 | 2-ethyl hexyl-acrylate | 70 | 2 | 53.4 | 70.2 |
| 19 | β-ethoxy ethyl acrylate | 70 | 2 | 59.2 | 77.2 |

TABLE IV

| Example No. | Fusion time (sec.) | ASTM D-648 Heat Distortion °C. | ASTM D-256 Izod. Impact Strength Ft. Lb./Inch (Notched) at 25° Centigrade | at −29° Centigrade |
|---|---|---|---|---|
| 4 (control) | 35 | 62.5 | 0.45 | — |
| 10 | 27 | 57.3 | 0.9 | — |
| 12 | 300+ | — | 0.43 | — |
| 13 | 28 | 56.8 | 24.4 | 0.62 |
| 14 | 45 | — | 22.1 | — |
| 15 | 23 | 55.0 | 27.7 | — |
| 16 | 14 | — | 27.6 | 1.16 |
| 17 | 27 | 56.0 | 18.7 | 1.14 |
| 18 | 38 | 55.5 | 24.6 | 1.12 |
| 19 | 22 | 57.5 | 24.0 | 0.46 | heat distortion and notched Izod. impact strength. The compression molding procedure used was as follows: 105.6 grams of polymer were mixed with 2.1 grams of dibutyltin, S,S′-bis(isooctyl mercapto acetate), 3.76 grams of acrylic polymer processing aid, 0.52 grams of a low molecular weight polyethylene wax, and 1.58 grams of glycerol monostearate. The mixture of ingredients was compounded by milling on a two-roll mill heated to 410° F. Fusion of the mixture was found to occur within 30–60 seconds of the start of the milling operation. The milled formulations were molded at a temperature of 370° F. in a mold measuring 6×6×⅛″ using a time interval of 3 minutes and a pressure of 1,000 pounds per square inch. After molding, the samples are allowed to remain in the mold for an additional 2 minutes and then the pressure raised to 3200 pounds per square inch and this pressure held for 2 minutes. Samples were then cooled 2 minutes and removed from the mold. These samples were then tested for heat distortion according to ASTM Test Procedures D-648 for heat distortion and D-256 for notched Izod. impact strength. A special test procedure was used to determine fusion time which is defined as the maximum fusion torque measured using a Brabender Plastigraph. The procedure for measuring fusion time is as follows: Into the Brabender bowl, heated to 204° C., were added 55 grams of polymer, together with 2 parts of an organic stabilizer sold under the trademark Thermolite T-31 by M&T Chemicals, and 1 part of an organic stabilizer sold under the trademark Thermolite T-187 by the M&T Chemicals Corporation. The maximum fusion torque is determined by measuring the time from the addition of the above-described mixture of polymer and stabilizer into the Brabender Plastigraph with the rotors activated to the time when maximum torque is obtained

EXAMPLE 20

To a one liter glass autoclave equipped with a spiral stirring blade there was added 300 grams of a polyvinyl chloride bulk polymerized polymer made as in Example 4. The reactor was evacuated to 0.05 millimeters of mercury pressure and then pressurized to 100 psi gauge with nitrogen. This procedure was repeated and then there was added 0.5 milliliters of a 21 percent solution of acetyl cyclohexane sulfonyl peroxide in mineral spirits. The reactor was evacuated and cooled to 5° to 10° centigrade and 70 grams of n-butyl acrylate and 100 grams of vinyl chloride were added. After polymerization for 2 hours at 72° centigrade, an impact grade polyvinyl chloride copolymer was obtained useful in the preparation of moldings.

EXAMPLE 21

A vertical stainless steel first stage reactor of 2½ gallon capacity as described in Example 1, equipped with a radial turbine type agitator of 3¼ inch outside diameter was charged with an air-free mixture of about 4,540 g. of vinyl chloride, 0.38 ml of 50–53% solution of diisobutyryl peroxide initiator in odorless mineral spirits (Lupersol 227, Lucidol Division of The Pennwalt Company), 2.20 ml of a 40% solution of di(2-ethylhexyl)-peroxydicarbonate initiator in mineral spirits (Lupersol 223 M, Lucidol Div. of Pennwalt Co.), 0.776 g of odorless mineral spirits, 1.081 g. of epoxidized soybean oil and 30 grams (corresponding to 1.15% of the vinyl chloride monomer reactant) of an ethylene-propylene-ethylidene norbornene terpolymer of weight average molecular weight of about 180,000 which had previously been dispersed in liquid vinyl chloride. Over a period of 55 minutes, with high speed agitation employing an agitator speed of 2000 rpm, the mixture was heated from 20° to 70° under autogenous superatmospheric pressure and then was maintained at 70° for 15 minutes.

The reaction mixture was then transferred to a second stage reactor as described in Example 1 equipped with a spiral agitator of 11⅜ inch outside diameter, which contained an air-free mixture of about 2270 g. of vinyl chloride monomer, 3.80 ml. of the diisobutyryl peroxide initiator, 5.5 g. of lauroyl peroxide initiator, 0.776 g. of odorless mineral spirits, 5.48 g. of octylphenoxy polyethoxy ethanol (a liquid surface active agent manufactured under the trademark TRITON X-100 by Rohm and Haas Co.) and 91.0 g. (corresponding to 1.34% of the vinyl chloride monomer added to the polymerization reaction up to this point) of ethylene-propylene copolymer of a weight average molecular weight of about 160,000. The resulting mixture was agitated at a low speed of agitation of 63 r.p.m. for three hours at 49° and then an additional 4540 g. of vinyl chloride were added to the mixture over a 30 minute period. On completion of the addition the reaction mixture was agitated at 49° for 15 minutes. Over a 15 minute period the agitated reaction mixture was heated from 49° to 60° and then maintained at the latter temperature for 15 minutes to insure that all of the diisobutyryl peroxide initiator was consumed. Over about a 20 minute period, the agitated reaction mixture was heated from 60° to 70° and agitation of the reaction mixture was continued at the latter temperature until a drop in the reaction pressure indicated that polymerization was substantially complete (or no longer than about 8 hours for the total duration of reaction in the first and second stage reaction zones).

A solution of 1.2 g. of 2,6 di-t-butyl p-cresol antioxidant color stabilizer in a mixture of 22.7 g. of epoxidized soybean oil and 2.33 g. of odorless mineral spirits was added under pressure to the polymerized product in the reactor and the resultant mixture was agitated for 15 minutes at 72°. Unreacted vinyl chloride monomer was vented from the reactor and about 9040 g. of product (corresponding to a conversion of about 79.6% based on the total vinyl chloride monomer charged to the reaction) was recovered. As determined by gel permeation chromatography the weight average molecular weight and the number average molecular weight of the product were, respectively, about 72,800 and about 25,600 with the ratio of weight average molecular weight to number average molecular weight being about 2.84. The product contained 12.6% of scale (i.e. particles greater than about 0.5 inch size) 11.1% of particles greater than 20 mesh size but less than 0.5 inch size, 2.0% of particles greater than 40 mesh size but less than 20 mesh size, 16.6% of particles greater than 70 mesh size but less than 40 mesh size and 57.7% of particles less than 70 mesh size.

As determined by Coulter Counter analysis of the latter predominant fraction of the product, 84% of the fraction had an average particle of less than 44.1 microns, 50% of the fraction had an average particle size of less than 37.9 microns and 16% of the fraction had an average particle size of less than 31.6 microns.

The bulk density of the aforementioned fraction of product having an average particle size less than 70 mesh was 0.55 g. per cc. The plastisol viscosity of this fraction was 2960 centipoises as measured on a Brookfield viscometer at 25°±3°, this value being about 8% lower than the corresponding viscosity of a proprietary conventional vinyl chloride homopolymer extender resin (Borden 260SS, Borden Chemical Co.) prepared by the suspension omode of polymerization.

It will be appreciated by those skilled in the art that procedural modifications of the above-described experimental technique can be made without departing from the spirit and scope of the invention. For example, the staged raising (i.e. ramping) of the reaction temperature from 49° to 72° (which follows post-polymerization addition of additional monomer in the second reaction stage) can be accomplished more rapidly than by direct heating of the reaction mixture as described, i.e. by preheating the monomer, before its addition, to above 72° and then adding the hot monomer to the reaction mixture at 49° (by incremental addition, if desired), thereby raising the temperature of the resultant mixture from 49° to the desired final reaction mixture temperature of 72°.

The invention has been described in the above specification and illustrated by reference to specific embodiments in the illustrative examples. However, it is to be understood that those embodiments are not intended to limit the invention since, as illustrated, changes and modifications in the specific details disclosed hereinabove can be made without departing from the scope or spirit of the invention.

What is claimed is:

1. A process for the preparation of small particle size polymer of vinyl halide by bulk liquid phase polymerization comprsing the steps of:
    1. polymerization of a monomer composition comprising a vinyl halide monomer or a mixture of a vinyl halide monomer with an ethylenically unsaturated comonomer copolymerizable therewith, in a first stage using high speed agitation at a temperature of from about 30° to about 70° centigrade in the presence of a water-free particle size control additive selected from the group consisting of:
        a. an inorganic or organic, inert, fine particle size material which is solid at least at the reaction temperature and insoluble in said monomer, said material having an average particle size in the range of about 0.001 to about 50 microns and said material being present in the amount of 0.001 to 5 percent by weight based upon said monomer composition present in said first stage;
        b. a surface active agent in an amount of 0.01 to 5 percent by weight based upon said monomer present in said first stage;
        c. a mixture of said inert, fine particle size material and said surface active agent; and
        d. a polyolefin in an amount of about 0.05 to about 4 percent by weight based upon said monomer composition present in said first stage;
    until about 3 to about 20 percent by weight of said monomer composition has been converted to polymer particles,
    2. continuing the preparation of small particle size polymers by polymerization in a second stage during which the reaction mixture is subjected to low speed agitation, until about 30 to about 95 percent by weight of the monomer composition has been converted to base polymer,
    3. introducing additional monomer into said second stage comprising at least one vinyl halide monomer or at least one comonomer which copolymerizes therewith or mixtures thereof and
    4. carrying out the polymerization of said additional monomer in said second stage to provide non-porous polymer particles by increasing the second stage polymerization temperature after about 30 to about 80 percent by weight of said reaction mixture has been converted to polymer, from a range of about 30° to about 70° centigrade to a range of about 60° to 80° centigrade, said increase in polymerization temperature being about 10° to about 50° centigrade.

2. The process of claim 1 wherein the additive in the first stage is selected from the group consisting of (a) the inert fine particle size material, (b) the surface active agent, and (c) the mixture of said inert, fine particle size material and said surface active agent.

3. The process of claim 2 wherein said inert, fine particle size material is a fumed silica.

4. The process of claim 2 wherein the surface active agent is octylphenoxy polyethoxyethanol.

5. The process of claim 1 wherein the additive in the first stage is the polyolefin.

6. The process of claim 5 wherein said preparation of small particle size polymers by polymerization in a second stage during which the reaction mixture is subjected to low speed agitation until about 30 to about 95 percent by weight of the reaction mixture has been converted to base polymer, is carried out in the presence of additional polyolefin added in an amount of about 0.05 to about 3 percent by weight based upon the weight of monomer composition added up to said point of polyolefin addition.

7. The process of claim 6 wherein the monomer composition polymerized in the first stage is vinyl chloride and the monomer composition polymerized in the second stage until about 30 to about 95% by weight of monomer composition is converted to polymer is vinyl chloride.

8. The process of claim 7 wherein the polyolefin additive of the first stage has a weight average molecular weight of about 50,000 to about 1,000,000.

9. The process of claim 8 wherein the first stage polyolefin additive is ethylene-propylene-ethylidene norbornene terpolymer.

10. The process of claim 8 wherein the polyolefin additive of the second stage has a weight average molecular weight of about 50,000 to 300,000.

11. The process of claim 10 wherein a surface active agent is added to the second stage polymerization with said second stage polyolefin additive, said surface active agent being employed in an amount of about 0.01 percent to about 0.2 percent based on the weight of monomer composition added up to said point of polyolefin addition.

12. The process of claim 11 wherein said second stage polyolefin additive is ethylene-propylene copolymer.

13. The process of claim 12 wherein the surface active agent added in the second stage is octylphenoxy polyethoxy ethanol.

14. The process of claim 10 wherein 1 to 200% by weight of said additional monomer based upon the weight of the resultant converted base polymer or copolymer is added all at once.

15. The process of claim 14 wherein the additional monomer added in said second stage is vinyl chloride.

16. The process of claim 15 wherein the polymerization in step (2) is continued until about 30 to about 80 percent by weight of the monomer composition has been converted to base polymer.

17. In a process for the preparation of a polymer of vinyl halide by bulk liquid phase polymerization of a monomer composition comprising the steps of:
1. polymerizing a vinyl halide monomer composition in a first stage with high speed agitation at a temperature of from about 30° to about 70° centigrade until about 3% to about 20% by weight of said monomer has been converted to polymer, and
2. continuing the preparation of said polymer in a second stage with low speed agitation;
the improvement which comprises continuing the polymerization in said second stage until about 30 to about 95% by weight of said monomer composition has been converted to said polymer and then introducing at least one ethylenically unsaturated comonomer which is copolymerizable with said vinyl halide monomer in the presence of said polymer, which polymerizes at the same or faster rate than vinyl chloride, and which is other than a vinyl halide monomer, and completing polymerization.

18. The process of claim 17 wherein the monomer composition polymerized in the first stage is vinyl chloride and the monomer added in said second stage is an acrylate monomer selected from the group consisting of an alkyl acrylate, the homopolymer of which has a glass transition temperature of 10° C. or below, or mixtures of said alkyl acrylates.

19. The process of claim 18 wherein said acrylate monomer is selected from ethyl acrylate, n-butyl acrylate, n-hexylacrylate, n-octyl-acrylate, and 2-ethyl hexylacrylate.

20. In the process for the preparation of a polymer of a vinyl halide monomer comprising bulk polymerizing in liquid phase a vinyl halide monomer with at least one comonomer copolymerizable therewith, in the presence of a base polymer, of the vinyl halide monomer, the improvement wherein said comonomer is an ethylenically unsaturated compound other than a vinyl halide monomer which polymerizes at the same or faster rate than vinyl chloride and which is different than that used to produce said vinyl halide base polymer, said vinyl halide monomer-comonomer polymerization constituting the final polymerization reaction of the process.

21. The process of claim 20 wherein said vinyl halide monomer is vinyl chloride and said comonomer is an acrylate monomer selected from the group consisting of an alkyl acrylate, the homopolymer of which has a glass transition temperature of 10° C. or below, or mixtures of said alkyl acrylates.

22. The process of claim 20 wherein said acrylate monomer is selected from ethylacrylate, n-butyl acrylate, n-hexylacrylate, n-octyl-acrylate, and 2-ethyl hexylacrylate.

23. A process for the preparation of a vinyl halide copolymer comprising:
(1) admixing a first component consisting of a seed base polymer of a vinyl halide monomer produced by bulk, suspension or emulsion polymerization processes and the vinyl halide monomer with a second component consisting of at least one ethylenically unsaturated comonomer other than a vinyl halide monomer which polymerizes at the same or faster rate than vinyl chloride; and which is different than that used to produce said vinyl halide base polymer seed;
(2) initiating a liquid phase bulk polymerization process; and (3) continuing polymerization until conversion to said vinyl halide copolymer is completed, said bulk polymerization of said vinyl halide monomer and said second component constituting the final polymerization reaction of the process.

24. The process of claim 9 wherein the comonomer is introduced into said second stage when about 50 to about 95 percent by weight of said reaction mixture has been converted to polymer.

25. The process of claim 23 wherein said vinyl halide monomer is vinyl chloride and said comonomer is an acrylate monomer selected from the group consisting of an alkyl acrylate, the homopolymer of which has a glass transition temperature of 10° C. or below, or mixtures of said alkyl acrylates.

26. A vinyl chloride polymer product of impact strength of about 2 to about 30 foot pounds per inch prepared by the bulk liquid phase process which comprises the steps of:
  (1) polymerizing vinyl chloride monomer in a first stage with high speed agitation at a temperature of from about 30° to about 70° centigrade until about 3% to about 20% by weight of said monomer has been converted to polymer, and
  (2) continuing the preparation of said polymer by polymerization in a second stage with low speed agitation;
until about 30 to about 95% by weight of said vinyl chloride monomer has been converted to said polymer and then introducing an acrylate monomer selected from the group consisting of ethyl acrylate, n-butyl acrylate, n-hexylacrylate, n-octyl-acrylate, 2-ethyl hexylacrylate and mixtures thereof, and completing the polymerization.

27. A small particle size polymer of vinyl halide prepared by a bulk polymerization in liquid phase comprising the steps of:
  (1) polymerization of a monomer composition comprising a vinyl halide monomer or a mixture of a vinyl halide monomer with an ethylenically unsaturated comonomer copolymerizable therewith, in a first stage using high speed agitation at a temperature of from about 30° to about 70° centigrade in the presence of a water-free particle size control additive selected from the group consisting of:
    (a) an inorganic or organic, inert, fine particle size material which is solid at least at the reaction temperature and insoluble in said monomer, said material having an average particle size in the range of about 0.001 to about 50 microns and said material being present in the amount of 0.001 to 5 percent by weight based upon said monomer composition present in said first stage,
    (b) a surface active agent in an amount of 0.01 to 5 percent by weight based upon said monomer present in said first stage;
    (c) a mixture of said inert, fine particle size material and said surface active agent; and
    (d) a polyolefin in an amount of about 0.05 to about 4 percent by weight based upon said monomer composition present in said first stage;
  until about 3 to about 20 percent by weight of said monomer composition has been converted to polymer particles,
  (2) continuing the preparation of small particle size polymers by polymerization in a second stage during which the reaction mixture is subjected to low speed agitation, until about 30 to about 95 percent by weight of the monomer composition has been converted to base polymer,
  (3) introducing additional monomer into said second stage comprising at least one vinyl halide monomer or at least one comonomer which copolymerizes therewith or mixtures thereof, and
  (4) carrying out the polymerization of said additional monomer in said second stage to provide non-porous polymer particles by increasing the second stage polymerization temperature after about 30 to about 80 percent by weight of said reaction mixture has been converted to polymer, from a range of about 30° to about 70° centigrade to a range of about 60° to 80° centigrade, said increase in polymerization temperature being about 10° to about 50° centigrade.

28. The product of claim 27 wherein the additive in the first stage is the polyolefin.

29. A polymer of vinyl halide prepared by a bulk in liquid phase polymerization process which comprises the steps of:
  (1) polymerizing a vinyl halide monomer composition in a first stage with high speed agitation at a temperature of from about 30° to about 70° centigrade until about 3% to about 20% by weight of said monomer has been converted to polymer, and
  (2) continuing the preparation of said polymer by polymerization in a second stage with low speed agitation until about 30 to about 95% by weight of said monomer composition has been converted to said polymer and then introducing at least one ethylenically unsaturated comonomer which is copolymerizable with said vinyl halide monomer in the presence of said polymer, which polymerizes at the same or faster rate than vinyl chloride, and which is other than a vinyl halide monomer, and completing the polymerization.

30. A polymer of a vinyl halide monomer prepared by the process which comprises bulk polymerizing in liquid phase the vinyl halide monomer with at least one comonomer copolymerizable therewith, in the presence of a base polymer of the vinyl halide monomer, said comonomer being an ethylenically usaturated compound other than a vinyl halide monomer which polymerizes at the same or faster rate than vinyl chloride and which is different than that used to produce said vinyl halide base polymer, said vinyl halide monomer-comonomer polymerization constituting the final polymerization reaction of the process.

* * * * *